United States Patent
Redl et al.

(10) Patent No.: US 11,197,486 B2
(45) Date of Patent: *Dec. 14, 2021

(54) INCLUSION CONTAINING PROTEINACEOUS MEAT ANALOGUE HAVING AN IMPROVED TEXTURE AND AN EXTENDED SHELF-LIFE

(71) Applicant: TEREOS STARCH & SWEETENERS, Aalst (BE)

(72) Inventors: Andreas Redl, Aalst (BE); Aurelien Feneuil, Aalst (BE); Fabrice Vogel, Wolfisheim (FR)

(73) Assignee: TEREOS STARCH & SWEETENERS

( * ) Notice: Subject to any disclaimer, the term of this patent is extended or adjusted under 35 U.S.C. 154(b) by 285 days.

This patent is subject to a terminal disclaimer.

(21) Appl. No.: 15/509,185

(22) PCT Filed: Sep. 7, 2015

(86) PCT No.: PCT/IB2015/056837
§ 371 (c)(1),
(2) Date: Mar. 6, 2017

(87) PCT Pub. No.: WO2016/035059
PCT Pub. Date: Mar. 10, 2016

(65) Prior Publication Data
US 2017/0258123 A1 Sep. 14, 2017

(30) Foreign Application Priority Data

Sep. 5, 2014 (BE) .................................. 2014/0668

(51) Int. Cl.
*A23J 3/22* (2006.01)
*A23L 29/00* (2016.01)
*A23J 3/18* (2006.01)

(52) U.S. Cl.
CPC ................ *A23J 3/227* (2013.01); *A23J 3/18* (2013.01); *A23L 29/00* (2016.08); *A23V 2002/00* (2013.01)

(58) Field of Classification Search
CPC .............. A23L 29/00; A23J 3/227; A23J 3/18
See application file for complete search history.

(56) References Cited

U.S. PATENT DOCUMENTS 3,102,031 A   8/1963  MacAllister et al.
3,645,747 A * 2/1972  Palmer .................... A23J 3/227
                                                              426/506

(Continued)

FOREIGN PATENT DOCUMENTS

CN     101541187 A    9/2009
EP       0262276 A1   4/1988
(Continued)

OTHER PUBLICATIONS

"How to Make Dry Dog Food more appealing to Your Dog" Web Archived from Webarchive.org Jul. 24, 2014 https://web.archive.org/web/20140724014512/https://www.pets4homes.co.uk/pet-advice/how-to-make-dry-dog-food-more-appealing-to-your-dog.html (Year: 2014).*

(Continued)

*Primary Examiner* — Katherine D Leblanc
(74) *Attorney, Agent, or Firm* — Fresh IP PLC; Clifford D. Hyra; Aubrey Y. Chen

(57) ABSTRACT

An extended shelf-life proteinaceous meat analogue comprises at least one inclusion included in a matrix which comprises vegetable proteins including at least wheat gluten and a plasticizer. Said proteinaceous meat analogue has a water content of less than 20% (w/w) and a torque value at 10 mn of at least 6 gram meter (g*m), as determined by a test A. A method for obtaining an extended shelf-life proteinaceous meat analogue comprises the step of (i) mixing (Continued)

vegetable proteins, including at least vital wheat gluten, and a plasticizer for obtaining a dough, (ii) shaping said dough by at least cutting the dough in dough pieces and agglomerating said dough pieces with at least one inclusion to obtain an agglomerate, and (iii) heating said agglomerate, wherein said extended shelf-life proteinaceous meat analogue has a water content of less than 20% (w/w). A food stuff comprises said extended shelf-life proteinaceous meat analogue and the method for obtaining said foodstuff.

13 Claims, 1 Drawing Sheet

(56) References Cited

U.S. PATENT DOCUMENTS

| | | | |
|---|---|---|---|
| 3,769,029 A | 10/1973 | Ganz | |
| 3,886,298 A | 5/1975 | Hayes, Jr. et al. | |
| 3,919,435 A * | 11/1975 | Feldbrugge | A23J 3/227 |
| | | | 426/574 |
| 5,922,392 A | 7/1999 | Kelly et al. | |
| 2005/0008758 A1 | 1/2005 | Howse | |
| 2010/0074998 A1 | 3/2010 | Espeleta Vega et al. | |
| 2012/0093994 A1 | 4/2012 | Hsieh | |

FOREIGN PATENT DOCUMENTS

| | | |
|---|---|---|
| EP | 1066759 A1 | 1/2001 |
| EP | 1743529 A1 | 1/2007 |
| FR | 2287177 A1 | 5/1976 |
| GB | 977238 A | 12/1964 |
| GB | 1288193 A | 9/1972 |
| GB | 1389592 A | 4/1975 |
| GB | 1448875 A | 9/1976 |
| GB | 1498395 A | 1/1978 |
| JP | H0698686 A | 4/1994 |
| WO | 2004016097 A1 | 2/2004 |
| WO | 2012008994 A2 | 1/2012 |

OTHER PUBLICATIONS

"Glycerine: an overview" The Soap and Detergent Association, p. 1-27 1990 (Year: 1990).*
"What is an Humectant" Web archived Jan. 13, 2007 https://web.archive.org/web/20070113183654/https://www.wisegeek.com/what-is-an-humectant.htm (Year: 2007).*
"Humectant" Retrieved Mar. 2, 2020 https://www.thefreedictionary.com/humectant (Year: 2020).*
International Search Report dated Feb. 23, 2016.
M.A. Asgar et al: "Nonmeat Protein Alternatives as Meat Extenders and Meat Analogs", Comprehensive Reviews in Food Science and Food Safety, vol. 9, No. 5, Sep. 1, 2010, pp. 513-529.
H. Levine, et al."Water as a plasticizer: physico-chemical aspects of low-moisture polymeric systems," Publisher: Cambridge University Press htpps://doi.org/10.1017/CBO9780511552083.002; Water Science Reviews 3; Water Dynamics Print publication year: 1988 Online publication date: Dec. 2009; pp. 79-185.
International search report (ISR) dated Mar. 1, 2016 of patent application WO 2016/035058 (PCT/IB2015/056834).
Smith, O. B. et al.: "Engineering 'meat'.", Food Engineering 1975 Wenger Int. Inc., vol. 47, No. 10, Oct. 1975, pp. EF22-EF33.
Fu, Y. "Modem Soy Products Processing Technology", Science and Technology Literature Press, Oct. 2011, pp. 281 and 285.

* cited by examiner

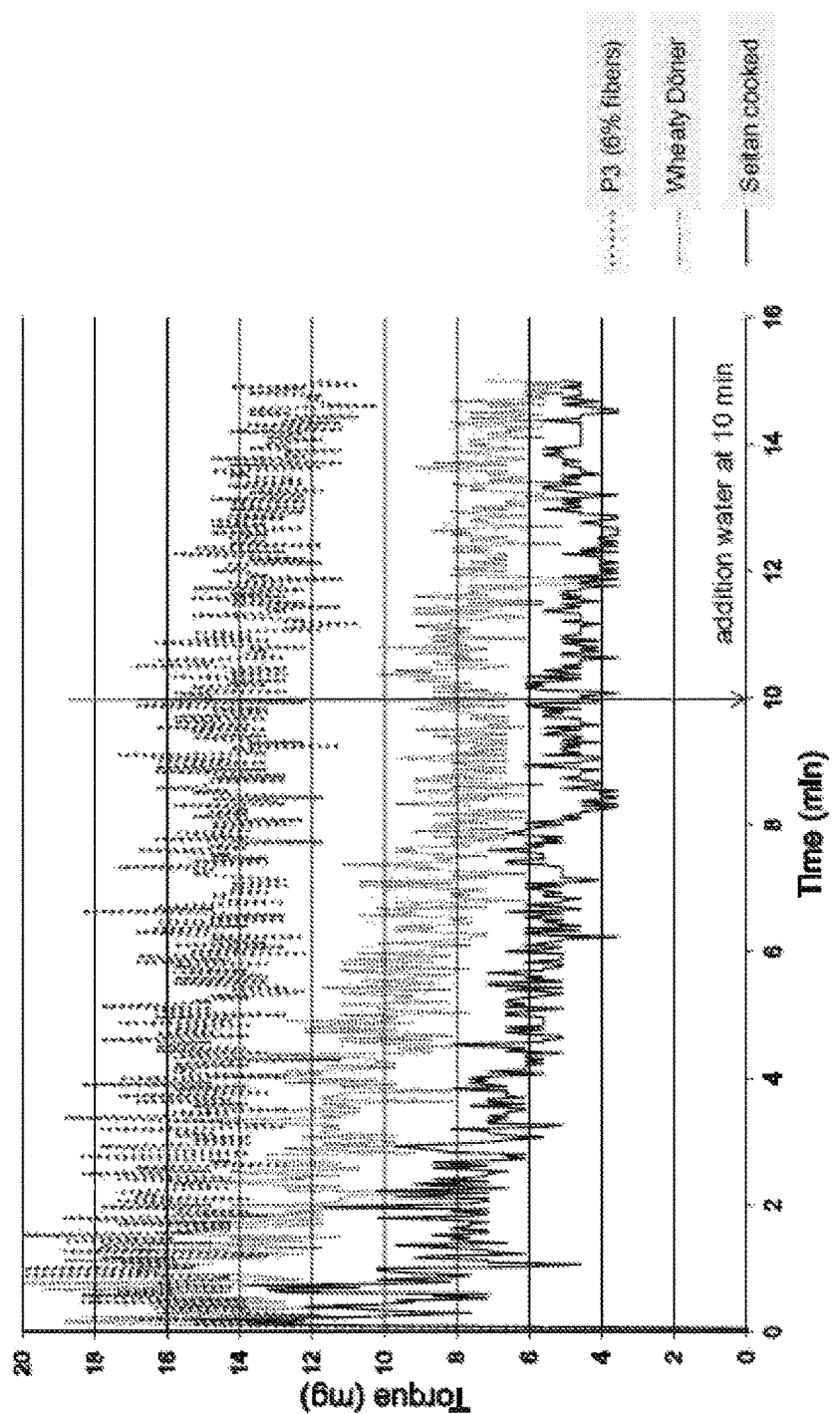

INCLUSION CONTAINING PROTEINACEOUS MEAT ANALOGUE HAVING AN IMPROVED TEXTURE AND AN EXTENDED SHELF-LIFE

This application claims the benefit of Belgian patent applications No. 2014/0668, filed Sep. 5, 2014, which is hereby incorporated by reference in its entirety.

FIELD OF THE INVENTION

This invention concerns an extended shelf-life proteinaceous meat analogue and the method for obtaining such extended shelf-life proteinaceous meat analogue. The invention also concerns a ready to eat proteinaceous meat analogue and the method for obtaining such ready to eat proteinaceous meat analogue. The invention further concerns a foodstuff comprising said extended shelf-life proteinaceous meat analogue or ready to eat proteinaceous meat analogue and the method for obtaining said foodstuff.

BACKGROUND OF THE INVENTION

Several types of wheat gluten-based meat analogues or wheat gluten based intermediates for preparing meat analogues have already been described in the state of the art.

The best known wheat gluten-based meat analogue is "SEITAN". This is in fact a wheat gluten dough which is seasoned. This dough is then cooked to provide the "wheat meat". Before final processing, SEITAN must be stored cold, or in frozen conditions, because of its high moisture content (>50% moisture).

Apart from SEITAN, also other wheat protein based meat replacers have been described in the prior art. However, it has been observed that the products of the prior art, if used as meat analogues or meat extenders, do show a number of shortcomings with regard to texture, storage stability and/or ease of processing. This might explain the relatively limited success of such products in the market.

Among those products from the prior art texturized meat analogues can be mentioned, such products are obtained by an extrusion step at high temperature (more than 120° C.), those products are usually named high moisture texturized proteins (HMTP) or low moisture texturized proteins (LMTP). The methods for obtaining LMTP are for example disclosed in U.S. Pat. No. 5,922,392, GB1288193, U.S. Pat. No. 3,769,029 or WO2012/008994 and provide products having spongy texture and which cannot be shaped easily without using binders such as eggs. The HMTP are difficult to manufacture and may have a mushy consistency if expansion directly after the extrusion at high temperature. Usually, a cooling die is used at the end of the extrusion in order to avoid any expansion of the product. However, such cooling die is regularly clogged, thereby varying pressure within the barrel of the extruder and resulting in an unpredictable efflux of the product from the die as mentioned in US 20100136201. Moreover, an incorrect orientation of fibers in the product may take place inducing additional treatment of the product to re-orientate the fibers. Such treatment leads to complex and costly installations. A simple and cheap process providing a proteinaceous meat analogue having a good texture is needed.

Besides, the applicant has developed a low moisture plasticized wheat gluten composition (WO2007006431). However, this composition is only suitable for use in chewy pet food applications, because of its high breaking force.

Prior art also described meat analogues obtained by agglomerating protein filaments or protein fibers by using a binder such as albumin notably by making an emulsion then coagulating the emulsion obtained, such process is disclosed in GB977238. Such protein filaments or protein fibers are obtained by spinning process, which consists in the precipitation of a protein solution to form stretched fibers. However, spinning produces large waste water streams. In addition, the necessity for low pH, high salt concentrations and chemical additives makes the process very complex to implement (Manski et al., 2007).

Therefore the goal of this invention is to provide proteinaceous meat analogues showing improved meat-like properties with regard to texture, chewiness and bite, compared to already existing products, but also to provide proteinaceous meat analogues which can be shaped easily without adding any binder so as to form big pieces of meat analogues with irregular shapes such as natural pieces of meat but also so as to include easily pieces food (vegetables . . . ) to provide a foodstuff having a good nutritional intake. At the same time it is the purpose of this invention to provide storage stable intermediates, which after hydration, provide easily ready to eat meat analogues showing a feeling in mouth which is as close as possible to meat without any additional treatment. Further, the invention provides processes for preparing these proteinaceous meat analogues and their storage-stable intermediates.

DESCRIPTION OF THE INVENTION

Extended shelf-life proteinaceous meat analogue and the method for obtaining such extended shelf-life proteinaceous meat analogue The invention is about a method for obtaining an extended shelf-life proteinaceous meat analogue comprising the step of:

mixing at a temperature of less than 100° C. i) vegetable proteins among which at least vital wheat gluten (VWG) ii) a plasticizer and optionally iii) fibers for obtaining a dough, shaping said dough by at least cutting the dough in dough pieces and agglomerating said dough pieces with at least one inclusion to obtain an agglomerate, and heating preferably static heating between 120 to 160° C. during 1 minute to 1 hour of said agglomerate for obtaining an extended shelf-life proteinaceous meat analogue wherein said extended shelf-life proteinaceous meat analogue has a water content of less than 20% (w/w) and preferably, wherein said plasticizer is selected among a polyhydroxy alcohol, a starch hydrolysate, a carboxylic acid and mixture thereof.

Typically, the mixing step may be implemented by any mixing device capable of handling high viscosity materials (such as z blenders, ribbon mixers, planetary mixers or co rotating intermeshing extruders). Advantageously, the mixing step is carried out in a batch or a continuous mixing unit, preferably at a temperature of less than 100° C. (such as between 20 to 90° C., preferably, 30 to 65° C. more preferably 40 to 50° C.) for a period sufficient to obtain a dough-like composition. Typically, the mixing step is an extrusion step.

According to the invention, an "extrusion" refers to a process in which a material is pushed under compressive stresses through a deformation control element such as a die to form an elongated product. Continuous extrusion refers to an extrusion process where such deformation is carried out on a product of unlimited length. Advantageously, the extrusion according to the invention is implemented at a temperature of less than 100° C., such as between 20 to 90° C., preferably, 30 to 65° C. more preferably 40 to 50° C. Indeed, the inventors have shown that a mixing step at a temperature above 100° C. notably by extrusion at temperature above 100° C. provides a product having spongy texture which is not observed for the product of the invention.

Advantageously, a food product, a food additive and/or a processed food may be added during the mixing step. Such food product, food additive and/or processed food may be in a dried form or a hydrated form, typically by having a water content of more than 50%.

As used herein "processed food" refers to a food which is significantly modified from its natural state, as by mechanical alteration (such as grinding or chopping), combination with other food products or additives, and/or cooking. As used herein, "processed food" excludes foods which substantially maintain their natural state after processing. For example, fresh produce may be washed, sorted, coated or treated, and packaged, but remain substantially in its natural state after processing, and would not be considered a "processed food" for the purpose of this disclosure. A "processed food" also refers to an extract of food. The "extract" refers to the resultant solid or liquid material from an extraction. Indeed, an extract obtained from animal origins (such as meat or fish) or vegetal origins, such extract may be soluble or insoluble carbohydrates, proteins, fibers, fat, or combinations thereof. The processed food may comprise oil or fat particles, and particularly preferred is vegetable oil or fat, especially that used in the form of sunflower oil. The processed food may also comprise particles of an inorganic salt. Calcium or magnesium salts are preferred. The processed food may comprise an insoluble material, for example an insoluble organic or inorganic salt.

As used herein "food products" refers to pieces of meat or fish or vegetables such as for example nuts, cereals, carrots, leguminous.

As used herein "food additives" preferably includes simulated meat flavorings such as pork flavor, pepperoni flavor, smoke powder, chicken flavor, beef flavor, seafood flavor, savory flavorings (e.g., onion, garlic), vitamins (such as vitamins B12) and mixtures thereof.

According to the invention, said dough obtained by mixing of vegetable proteins and at least one plasticizer can further be shaped before the static heating.

The shaping step according to the invention comprises at least one or a combination of cutting, molding, sheeting and agglomerating steps. Preferably, the shaping step comprises at least a cutting step and a molding or a sheeting step, more preferably a cutting step, a sheeting step and a molding step.

According to an embodiment, the shaping step comprises a cutting step, an agglomerating step and optionally a molding and/or a sheeting step.

The cutting step may be done by using any means having at least one blade, for example a meat mincer (mincing machine), or a meat cutter.

Typically, the shaping step comprises a cutting step, an agglomerating step and optionally a molding and/or a sheeting step.

Avantageously, the agglomeration is carried out by i) hydrating the dough pieces and/or said at least one inclusion and ii) mixing to obtain an agglomerate, typically having a water content of between 5-30%, preferably 7-25%, more preferably 10-20%.

According to one embodiment, the agglomeration may be carried out by
i) hydrating the dough pieces, preferably by spraying 1-10% water by weight of dough pieces, ii) adding the at least one inclusion, and iii) mixing to obtain an agglomerated mixture typically having a water content of between 5%-30%, preferably 7-25%, more preferably 10-20% or
i) hydrating the mixture of dough pieces and the at least one inclusion, preferably by spraying 1-10% water by weight of dough pieces, and ii) mixing the hydrated mixture to obtained an agglomerated mixture typically having a water content of between 5-30%, preferably 7-25%, more preferably 10-20% or
i) hydrating at least one inclusion preferably by spraying 1-10% water by weight of dough pieces, ii) adding the dough pieces, and iii) mixing to obtain an agglomerated mixture typically having a water content of between 5%-30%, preferably 7-25%, more preferably 10-20%.

As used herein, the term "inclusion" refers to a coherent mass which is a food product a food additive and/or a processed food. The inclusion is not a dough piece according to the invention. The inclusion should be of a size that is visible, as a discrete piece or pieces, in the meat analogue prepared. Preferably the inclusion has a maximum linear dimension of at least 1 mm, preferably of at least 3 mm, preferably between 1 and 8 mm. Unless stated otherwise, the size of the inclusion is quoted as the maximum linear dimension of the inclusion, i.e. the maximum length in any dimension. Typically, the inclusion may be a dried or an hydrated product or may contained naturally water.

According to the invention, the dough piece has a mass of at least 0.03 g preferably 0.04 to 300 g more preferably 0.05 to 30 g, 0.05 g to 3 g typically 0.05 g to 0.2 g. Advantageously, said dough piece may have a long or a circular shape.

The sheeting step may be implemented by compressing dough pieces between cylindrical rolls The molding step may be implemented by compressing dough pieces into molds of any desired shape.

The method of the invention is particularly advantageous in that without any added binder, the product develops a very good agglomerating and molding properties providing big pieces of meat analogues having very high volume. Moreover, the texture of the product obtained is dense enough to provide a uniform piece of meat analogue. Examples of size and texture which can be provided is the one of an escalope or a wiener schnitzel. Such pieces cannot be obtained by using the meat analogues of the prior art without adding a binder such as eggs or xanthan or starch providing a product which cannot be eaten by vegan people or having poor texture.

Moreover, the meat analogue according to the invention is particularly easy to mold and provides structure having irregular forms close to natural meat steaks or beefsteaks. Besides, the shaping steps such as the cutting, agglomerating, sheeting and molding steps can be repeated in order to obtain a product having a fibrillar structure which can be close to the myofril structure of skeletal muscles. Typically, a very nice fibrillar structure can be obtained when the dough pieces are of longitudinal shape.

As used herein the term "static heating" refers to a heating step without any stirring or shearing of the dough to be heated. An example of static heating may be oil frying, microwaving, or by using an oven, or a hot plate. Typically, the heating step is carried out at a temperature between 120 to 160° C. during 1 minute to 1 hour, typically, 10 min to 30 mn. The duration of the heating step can be adapted by the man skilled in the art depending on the volume of mixed proteins to be heated. The inventors have shown that boiling (100° C.) or an heating at 110° C. of the mix of vegetable proteins and plasticizer does not provide the meat analogue of the invention. Moreover, an heating step above 160° C. for example a classical frying step (at 185° C.) provides a product which has a very soft and spongy texture and a dark color.

It should be emphasized that meat analogues in accordance with the present invention may be used as meat replacements to provide a meatless foodstuff or as meat enhancers/extenders to replace a portion of the meat that would normally be present in a foodstuff As used herein an extended shelf-life product is a product which is shelf-stable at ambient temperatures for an extended period of time for e.g. up to and above 60 days. Such extended shelf-life product is microbiologically stable because of its reduced water content. Such an extended shelf-life product may be eaten after hydration and cooking. Such extended shelf life product may be a petfood, typically designated to cats and dogs.

As used herein the term "vital wheat gluten" refers to those forms of dried wheat gluten that have been subjected to only minimal or no heat denaturation during drying. Upon reconstitution with water, vital wheat gluten shows physical properties (e.g., elasticity, gumminess, etc.) similar to those of freshly prepared wet wheat gluten.

Preferably, the vegetable proteins are powdered vegetable proteins (as measured according to AOAC 979.09; Kjeldahl method with a conversion factor N*6.25). Advantageously, said vegetable protein powder has a water content of between 1 to 15% preferably 2 to 12%, typically, 3 to 7%. Said vegetable proteins may be vital wheat gluten (100% of vital wheat gluten) advantageously a vital wheat gluten powder. Typically, said vegetable proteins are a mixture of vital wheat gluten and vegetable proteins from at least one other origin. According to one embodiment, vegetable proteins comprise more than 50% of vital wheat gluten, preferably, more then 60, 70, 80, 85, 95% of vital wheat gluten. Preferably, the "vegetable proteins from at least one other origin" or "vegetable protein other than VWG" may be selected from a group consisting of potato, lupine, soya, pea, chick pea plants, alfalfa, faba bean, lentil, bean, rapeseed, sunflower and cereals such as corn, barley, malt and oats. Said vegetable proteins are typically in the form of flour, concentrate or isolate.

Vital wheat gluten or VWG refers to the dried, insoluble gluten portion of wheat flour from which the starch and soluble components have been removed by a washing process. Typically, vital wheat gluten is then dried to a fine powdered state. Vital wheat gluten powder typically has a percent protein on a dry basis of about 80% or greater (as measured according to AOAC 979.09; Kjeldahl method with a conversion factor N*6.25). Vital wheat gluten is typically not denatured as determined by the test procedure in "Approved Methods of the American Association of Cereal Chemist", Method 38 entitled "Vital Wheat Gluten" (December 1962). Useful vital wheat gluten powder is commercially available under the trade designation AMYGLUTEN®.

As used herein, a "plasticizer" refers to a compound that increases the plasticity or fluidity of the material to which it is added. Typically, the plasticizer of the invention is a "food grade plasticizer" which is a plasticizer approved to be used in foods. Advantageously, the plasticizer is a non-aqueous plasticizer, typically said plasticizer has a water content of less than 20% (w/w). Advantageously the plasticizer may be a polyhydroxy alcohol (such as glycerol, sorbitol, ethylene glycol, polyethylene glycol propyleneglycol, butanediol, polyethylenglycol and mixture thereof), a starch hydrolysate (such as a glucose syrup), a carboxylic acid and mixture thereof.

As used herein, "fibers" may be insoluble fibers, preferably from cereal, tuber, seed or leguminosae.

The term "water content" refers to the content of water based upon the Loss on *Drying method as described in Pharmacopeial Forum*, Vol. 24, No. 1, page 5438 (January-Feburary 1998). The calculation of water content is based upon the percent of weight that is lost by drying.

According to one embodiment, said proteinaceous meat analogue comprises:
- 30 to 90%, of vegetable proteins on dry mass, preferably 40 to 85%, more preferably 45 to 80% (w/w), even more preferably, 50% to 78% of vegetable proteins typically VWG notably VWG powder, advantageously said vegetable proteins comprises 40 to 90% of VWG powder and 0 to 40% of vegetable proteins other than VWG
- 10 to 40% (w/w), preferably, 15 to 30%, typically 20 to 27% of plasticizer on dry mass
- 0 to 8% (w/w) of fibers on dry mass Advantageously said method for obtaining an extended shelf-life proteinaceous meat analogue comprises mixing at a temperature of less than 100° C. of i) 30 to 90%, preferably 40 to 85% of VWG powder, ii) 10 to 40% of a plasticizer, iii) 0 to 40% preferably 3 to 30%, typically 5 to 20% of a vegetable protein other than VWG and iv) 0 to 8%, preferably, 1 to 5% of fibers.

The invention is also about an extended shelf-life proteinaceous meat analogue directly obtained by the method according to the invention.

The invention is further about an extended shelf-life proteinaceous meat analogue comprising at least one inclusion included in a matrix which comprises:
- 30 to 90% (w/w), preferably 40 to 85%, more preferably 45 to 80% (w/w), even more preferably, 50% to 78% of vegetable proteins among which at least wheat gluten, preferably at least 50% of wheat gluten,
- 10 to 40% (w/w), preferably, 15 to 30%, typically 20 to 27% of plasticizer,
- 0 to 8% (w/w) of fibers
- less than 20% (w/w) of water content.

Preferably said proteinaceous meat analogue has a water content of less than 20% (w/w) and a torque value at 10 mn of at least 6 gram meter (g*m) (preferably between 6 to 20, more preferably between 8 to 15), or a ratio torque value at 30 sec/torque value at 10 mn of about 1 to 1.7, as determined by a test A.

Indeed, the aim of the invention is to provide a meat analogue, meaning a product which may be a good meat replacer. The inventors have shown that the characteristic which is important to be a good meat analogue is to give the feeling of meat during mastication. The inventors have shown that to the opposite of the meat analogues of the market such as for example, the low moisture texturized proteins, the meat analogue of the invention gives a feeling which is very close to meat due to its physicochemical characteristics. The feeling during the first bite (30 sec) than after several mastications (10 min) can be evaluated by the ratio torque value at 30 sec/torque value at 10 min.

The invention is further about an extended shelf-life proteinaceous meat analogue comprising at least one inclusion included in a matrix comprising vegetable proteins among which at least wheat gluten, notably VWG such as for example VWG powder and a plasticizer said proteinaceous meat analogue having a water content of less than 20% (w/w) and a torque value at 10 mn of at least 6 gram meter (g*m) (preferably between 6 to 20, more preferably between 8 to 15), or a ratio torque value at 30 sec/torque value at 10 mn of about 1 to 1.7, as determined by a test A, preferably said proteinaceous meat analogue also comprises fibers.

As used herein the "torque value at 30 sec" is the value measured in the first 30 sec of the Brabender Plastograph assay (Test A or B). As used herein the "torque value at 10 mn" is the value measured after 10 min of the Brabender Plastograph assay. The torque values are measured in gram meter (g*m).

As used herein the torque value at 30 sec and the torque value at 10 mn of the extended shelf-life proteinaceous meat analogue are evaluated according to a Test A by using a Brabender Plastograph, type EC equipped with a type 50 measuring head and a mixing chamber comprising two counter-rotating identical sigma shaped mixing blades (references of the blades: Sigma (S)), the samples are hydrated to their equilibrium (their water holding capacity), meaning between 55 to 70% of water content by for example a boiling step of 20 mn or by hydrating the samples in excess of water during 48 h at room temperature, 70 g of cube shaped samples (15*15 mm) are then introduced in a mixing chamber thermo-stated at 37° C. and measurement is obtained by counter-rotating the mixing blades at differential speeds of 34 rpm and 22.67 rpm (34*2/3).

Preferably, the extended shelf-life proteinaceous meat analogue has a ratio torque value at 30 sec/torque value at 10 mn of about 1 to 1.7, typically, 1 to 1.6%, more preferably 1 to 1.5, preferably 1 to 1.4, more preferably 1 to 1.3, of about 1.1 to 1.25.

The invention, further concerns a foodstuff comprising the extended shelf-life proteinaceous meat analogue of the invention. Typically, said foodstuff is an extended shelf-life foodstuff advantageously having a water content of less than 20%. Said, foodstuff may be obtained by simply adding or mixing the extended shelf-life proteinaceous meat analogue with a food products, food additives and/or processed food.

The term "foodstuff" means any material, substance, additive, that can be used as food, feed or that may be added to food or feed. Typically the foodstuff is any composition which an animal, preferably a mammal such as a human, a dog or a cat may consume as part of its diet.

Said foodstuff may be for example dried food such as dry pet food, pet food treats but also food aiming at long transportation like food for soldiers, astronauts. Typically dried burger, sausage, schnitzel, "meat" ball, wok piece, filet.

A Ready to Eat Proteinaceous Meat Analogue and the Method for Obtaining such Ready to Eat Proteinaceous Meat Analogue The invention concerns a method for obtaining a ready-to-eat proteinaceous meat analogue wherein said method comprises step of
- obtaining an extended shelf-life proteinaceous meat analogue according to the method of the invention,
- hydrating said extended shelf-life proteinaceous meat analogue preferably, until a water content of more than 50% is reached preferably, 60 to 70% preferably 62 to 68% more preferably 65% water content and
- optionally, cooking said hydrated proteinaceous meat analogue
- obtaining a ready-to-eat proteinaceous meat analogue According to the invention, the cooking step is implemented at a temperature of more than 100° C., typically, at a temperature between 30 to 200° C. during 1 minute to 1 hour. Said cooking step may be for example a sterilization step.

The invention further concerns the ready-to-eat proteinaceous meat analogue directly obtained by the method of the invention.

The invention is further about a ready-to-eat proteinaceous meat analogue wherein, said ready-to-eat meat analogue comprises vegetable proteins among which at least wheat gluten, a plasticizer and preferably fibers and has a water content of more than 50%, preferably, between 60 to 70%, more preferably 62 to 68%, even more preferably 65% water content, a torque value at 10 mn of at least 6 gram meter meter (preferably between 6 to 20, more preferably between 8 to 15) or a ratio torque value at 30 sec/torque value at 10 mn of about 1 to 1.7, as determined by a Test B.

As used herein the torque value at 30 sec and the torque value at 10 mn of the extended shelf-life proteinaceous meat analogue comprised an extended shelf-life foodstuff are evaluated according to a Test A by using a Brabender Plastograph, type EC equipped with a type 50 measuring head and a mixing chamber comprising two counter-rotating identical sigma shaped mixing blades (references of the blades: Sigma (S)), hydrated to their equilibrium (their water holding capacity), meaning between 55 to 70% of water content by for example a boiling step of 20 mn or by hydrating the samples in excess of water during 48 h at room temperature, 70 g of cube shaped samples (15*15 mm) are then introduced in a mixing chamber thermo-stated at 37° C. and measurement is obtained by counter-rotating the mixing blades at differential speeds of 34 rpm and 22.67 rpm (34*2/3).

Preferably, the proteinaceous meat analogue has a ratio torque value at 30 sec/torque value at 10 mn of about 1 to 1.5, preferably 1 to 1.4, more preferably 1 to 1.3, of about 1.1 to 1.25.

As used herein "ready-to-eat proteinaceous meat analogue" refers to a proteinaceous meat analogue which can be eaten as is. A ready-to-eat foodstuff refers to a hydrated (having more than 50% (w/w) water content, between 60 to 70%, preferably 62 to 68%, more preferably 65% of water content) and optionally cooked foodstuff (with the same procedure such as meat e.g. at a temperature between 30 to 200° C. during 1 minute to 1 hour) or a foodstuff comprising a hydrated and optionally cooked (with the same procedure such as meat e.g. at a temperature between 30 to 200° C. during 1 minute to 1 hour) proteinaceous meat analogue.

As used herein the torque value at 30 sec and the torque value at 10 mn of the proteinaceous meat analogue comprised an ready-to-eat foodstuff are evaluated according to a Test B by using a Brabender Plastograph, type EC equipped with a type 50 measuring head and a mixing chamber comprising two counter-rotating identical sigma shaped mixing blades (references of the blades: Sigma (S)), 70 g of cube shaped samples (15*15 mm) are introduced in a mixing chamber thermo-stated at 37° C. and measurement is obtained by counter-rotating the mixing blades at differential speeds of 34 rpm and 22.67 rpm (34*2/3). If needed, the samples may be washed before analysis in order to remove any residual sauce, for example by several washing steps with water and if needed hot water.

According to the invention, said proteinaceous meat analogue is a cohesive material. Typically, said proteinaceous meat analogue has a Fi value of more than 30%, preferably between 50% and 80%.

As used herein, the "Fi value" refers to the percentage of protein insoluble in a SDS buffer. The Fi value reflects the level of crosslinking of the gluten proteins. Indeed, it has been demonstrated that a Fi value of vital gluten is less than 10% (Redl A, Morel M H, Bonicel J, Guilbert S, Vergnes B. *Rheol Acta* 1999; 38(4):311-20). A Fi value of more than 30% is observed for example when the gluten has undergone a thermal treatment.

The Fi value may be measured according to a method well known from the man skilled in the art, and is described for example in Redl A, Morel M H, Bonicel J, Guilbert S, Vergnes B. *Rheol Acta* 1999; 38(4):311-20. The Fi value of the proteinaceaous meat analogue is provided by the static heating step of the method of the invention.

The invention is also about a ready-to-eat proteinaceaous meat analogue comprising:
- 60 to 70%, preferably 62 to 68%, more preferably 65% water content
- 15-25% proteins (preferably 17-20%) among which more than 60% wheat gluten (preferably more than 70%, more preferably between 75 and 80%, or typically 100% of wheat gluten)
- 2-5% fat (3 to 4%)
- 8-15% (w/w) carbohydrates, typically between, 10 to 12% (w/w) among which less than 4% (w/w) of plasticizer, preferably 1 to 3.5% (w/w), more preferably 1.5 to 3% (w/w),
- 2 to 8% fibres, typically, between 3 to 6%, more preferably 3.2 to 5.8%.

As used herein, the term "fat" refers to triacylglycerides or triglycerides formed by the esterification reaction of long chain-, medium chain- or short chain-fatty acids with glycerol, a trihydroxy alcohol, or a mixture thereof, in any of solid, liquid or suspension forms, regardless of whether they are obtained from animal, fowl, fish or plants sources or are made synthetically, so long as they are safe for consumption by mammals, particularly humans.

As used herein, "Carbohydrate" refers to at least a source of carbohydrates such as, but not limited to, monosaccharides, disaccharides, oligosaccharides, polysaccharides or derivatives thereof.

Preferably, said ready to eat proteinaceous meat analogue has a water content of more than 50%, preferably, between 60 to 70%, more preferably 62 to 68%, even more preferably 65% water content, and/or a torque value at 10 mn of at least 6 gram meter meter (preferably between 6 to 20, more preferably between 8 to 15) and/or a ratio torque value at 30 sec/torque value at 10 mn of about 1 to 1.7, as determined by a Test B.

The invention is further about a foodstuff comprising the ready to eat proteinaceous meat analogue according to the invention. Typically, said foodstuff is an extended shelf-life foodstuff advantageously having a water content of more than 50%, preferably, between 60 to 70%, more preferably 62 to 68%, even more preferably 65% water content. Said, foodstuff may be obtained by simply adding or mixing the ready to eat proteinaceous meat analogue with a food products, food additives and/or processed food.

Said foodstuff may be a ready to eat foodstuff, for example a burger, a sausage, a schnitzel, a "meat" ball, a wok piece, a filet.

Although having distinct meanings, the terms "comprising", "having", "containing' and "consisting of" may be replaced with one another throughout the above description of the invention.

The invention will be further evaluated in view of the following examples and figures.

BRIEF DESCRIPTION OF THE FIGURES

FIG. 1. Comparison of torque values between commercial products and product according to the invention (P3 6% fibers)

DETAILED DESCRIPTION OF EMBODIMENTS

Examples

Example 1

Preparation of Wheat Gluten Based Products of the Invention

Vital wheat gluten powder (AMYGLUTEN®) (75 parts), glycerol (100%)(25 parts) and wheat fibre (VITACELL® 400) (0, 3 or 6 parts) are continuously mixed together in a twin screw extruder (Werner & Pfleiderer ZSK25) at a temperature of 65° C., and shaped and cut to obtain small particles with a ZGF30 pelletizer (Werner & Pfleiderer). These particles can then be stored at room temperature, without risk of spoilage. Three different kinds of products (A1, A2, and A3) are obtained, having a different content of fibres (0, 3 and 6%).

Agglomerates of these particles are prepared by spraying 3 parts of water over the particles, and manually pressing the hydrated particles together into a mould having the shape of a pork chop. The agglomerates obtained are then fried in cooking oil at 150° C. for 5 minutes, thereby providing products P1, P2 and P3.

Example 2

Chewing and Bite Properties of Meat Analogues, and Meat Products

The products prepared in example 1 were hydrated and then cooked in boiling water for 20 minutes, resulting in products containing 60-65% water (35-40% dry substance). Products differed in fibre content whereby P1 contained 0% fibre, P2 contained 3% fibre and P3 contained 6% fibre on dry substance.

The texture analysis was made in a Brabender Plastograph, type EC equipped with a type 50 measuring head and a mixing chamber comprising two counter-rotating identical sigma shaped mixing blades (references of the blades: Sigma (S)). 70 g of cube shaped samples (15*15 mm) are introduced in the mixing chamber thermo-stated at 37° C. and measurement is obtained by counter-rotating the mixing blades at differential speeds of 34 rpm and 22.67 rpm (34*2/3).

The torque values were recorded and compared with cooked meat products such as cooked beef, cooked chicken and cooked schnitzel. Also torque values for meat analogues available in commerce, such as SEITAN, and commercial products such as "VIANA" cowgirl veggie steak, and "TOPAZ" Wheaty Vegankebab Döner were compared with the products of the invention. All these products were also boiled in water for 20 minutes.

In the following table, torque values are given after 30 seconds, 10 minutes and 14 minutes for all the above cited products.

TABLE 1

Comparative analysis of torque values of meat pieces (beef, chicken, schnitzel) and meat analogues of the market (SEITAN, TOPAZ, VIANA) and of the invention at 30 sec, 10 min and 14 min.

| Torque (g*m) after | 30 sec | 10 min | 14 min |
| --- | --- | --- | --- |
| Cooked beef | 70 | 35 | 32 |
| Cooked chicken | 30 | 20 | 18 |
| Cooked schnitzel | 13 | 13 | 11 |
| Comm. Product 1 | 13 | 7 | 7 |
| Comm. Product 2 | 15 | 8 | 7 |
| Seitan | 10 | 5 | 5 |
| P1 | 13 | 12 | 10 |
| P2 | 14 | 13 | 13 |
| P3 | 17 | 14 | 13 |

A sensorial evaluation of the cooked pieces has been done in order to evaluate their textural properties compared with the measured values:

Cooked beef is experienced as quite hard in bite (as expected for a beef cooked for 20 min in water). This observation is confirmed by the torque results which are very high at 30 sec, a slight reduction is observed at 10 and 14 mn, Cooked chicken is experienced softer in bite than beef but still on the hard side. The torque values show quite constant results confirming the sensory evaluation.

Cooked schnitzel is experienced as having a nice texture in a well-balanced equilibrium between hardness and softness of the texture The commercial products 1 and 2 were good in the first bite but lost structure very soon after the first bite and got too soft, the commercial products 1 and 2 shows a ratio torque value at 30 sec/torque value at 10 mn of 1.9 which indicate a quick loss of texture in the mouth.

Commercial SEITAN product was too soft from the very first bite, all the torque values of SEITAN are below 10 g*m, which seems to be too soft for a tasty meat analogue.

The examples of the invention (P1, P2 and P3) were considered as very nice in the first bite and also maintained a good texture during chewing.

The results clearly show that measured torque values correspond well to the experience of eating the test pieces. Indeed, it is clear that the products of the invention do show much better chewing and bite properties than actually commercialised wheat gluten based meat analogues.

At the same time these values illustrate that the products of the invention approach chewing and bite properties of natural meat products.

Example 3

Vital wheat gluten powder (AMYTEX®)(50 parts), glycerol (100%)(33 parts), chick pea flour (13 parts) and wheat fibre (VITACEL® WF200) (4 parts) are continuously mixed together in a twin screw extruder (Werner & Pfleiderer ZSK25) at a temperature of 65° C., and shaped and cut to obtain small particles with a ZGF30 pelletizer (Werner & Pfleiderer), thereby providing product A4. These particles can then be stored at room temperature, without risk of spoilage.

Agglomerates of these particles are prepared by spraying 11 parts of water over the particles, and manually pressing the hydrated particles together into a mould of 15 mm thickness, thereby providing product W4. The product is then fried in cooking oil at 150° C. for 10 minutes, thereby providing the product P4, and hydrated for 48 hours in water, resulting in products containing 60-65% water (35-40% dry substance). This product is prepared and analyzed with the Plastograph as described in example 2.

TABLE 2

Analysis of torque value of the product of the invention at 30 sec, 10 min and 14 min.

| Torque (g*m) after | 30 sec | 10 min | 14 min |
| --- | --- | --- | --- |
| P4 | 16 | 10 | 10 |

Example 4

Different Cooking Conditions

The product W4 from example 3 is cut in pieces of 20×20 mm and cooked in several conditions.

The pieces are fried for 15 min either at 110° C. or at 150° C. or at 185° C. The pieces are cooked in an oven at 150° C. either for 15 min or for 30 min. The pieces are cooked in boiling water (100° C.) for 15 min. All these cooked products are then hydrated for 48 hours in water and tasted after cooking in a pan for 5 minutes.

The products cooked at 150° C. (in the oven or in the fryer) were good in texture and have a nice yellow to light brown color.

The product cooked at 185° C. is very dark (brownish, nearly black). Moreover, this product was found more spongy and softer in texture than products cooked at 150° C.

The products fried at 110° C. or boiled at 100° C. are found very white in appearance, so not attractive for a consumer and their texture was much softer than products cooked at 150° C.

Example 5

Vital wheat gluten powder (AMYGLUTEN®)(46 parts), chick pea flour (21 parts), wheat fibre (VITACEL® WF200) (4 parts) and glycerol (100%)(29 parts) are continuously mixed together in a twin screw extruder (Werner & Pfleiderer ZSK25) at a temperature of 65° C., and shaped and cut to obtain small particles with a ZGF30 pelletizer (Werner & Pfleiderer), thereby providing product A5. These particles can then be stored at room temperature, without risk of spoilage.

Agglomerates of these particles are prepared by adding 1 part of salt, 13 parts of water and 25 parts of hydrated chick pea over the particles in a Meissner bowl cutter (RS 35) and cutting for 1 min (speed 3 for the bowl and speed 2 for the blade). Then, the agglomerates are grinded continuously through a Hobart meat grinder attachment (Hobart A200N, plate of #12⅛"), thereby providing multiples strands.

Example 6

Vegan Wiener Schnitzel

The continuous product of example 5 is cut in portions of 100 mm length. Each portion is passed through a manual dough sheeter set with a thickness between the steel cylinders of 1 to 3 mm in order to form a schnitzel having dimensions of up to about 300 mm in diameter and of 4 to 7 mm in thickness.

The product is then fried in cooking oil at 150° C. for 15 minutes and hydrated for 48 hours in a vegetable broth (one vegetable bouillon cube of 11 g for 500 mL of water).

This product is then rolled in a mix of flour, yeast flakes, salt and water. Then, it is rolled in bread crumbs and fried at 170° C. for 5 minutes or cooked in a pan for 5 minutes in order to prepare a vegan Wiener schnitzel.

The obtained Wiener Schnitzel is very nice in taste, texture and appearance. It has a crusty crumb with a firm but still tender bite.

Example 7

The product of example 5 is passed continuously through a manual dough sheeter set with a thickness between the steel cylinders of 5 mm, thereby providing a continuous strip of 15 mm thickness and 150 mm width. Pieces of 15 mm×30 mm are cut from this strip.

These pieces are then fried in cooking oil at 150° C. for 15 minutes, thereby providing the product P5, and hydrated for 48 hours, resulting in products containing 60-65% water (35-40% dry substance). This product is prepared and analyzed with the Plastograph as described in example 2.

TABLE 3

Analysis of torque value of the product of the invention at 30 sec, 10 min and 14 min.

| Torque (g*m) after | 30 sec | 10 min | 14 min |
|---|---|---|---|
| P5 | 13 | 8 | 8 |

The nutritional content of the meat analogue of the invention was calculated and then compared to the ones of the meat analogue of the market (see table 4)

By comparing the products of the invention to the ones of the market based on wheat, pea or soy proteins, it can be seen that the product of the invention has a very low content in lipids but a high content in fibers, proteins and carbohydrates giving to this product a very nice nutritional profile.

Example 8

Product of Invention in a Complete Dish

The product P5 from example 7 is hydrated for 48 hours in a vegetable broth (one vegetable bouillon cube of 11 g for 500 mL of water).

The hydrated pieces (1280 g) were cooked with:
80 g of Chinese dried black mushrooms (hydrated in excess of warm tap water)
1.6 L of Coconut milk
0.8 L of Coconut cream
150 g of Ginger (minced in SEB Optimo cutter)
100 g of Lemon Grass (cut in pieces)
50 g green curry
50 g Basil (cut in fine pieces)
50 g of Soy sauce
2 g dried lime grass
100 mL of sunflower oil The whole recipe was cooked on gentle heat and stirred for 30 min.

Upon stirring and heating, pieces remain entire without any disintegration. The whole dish is very attractive in appearance and taste.

Example 9

Sausages Containing Carrots, Parsnips and Leek 600 g of product A4 from example 3 are mixed with 150 g of leek, 125 g of carrots and 125 g of parsnips in a Stephan cutter (UM 12 V Type). The mixture is then formed into sausages with a Bomann meat grinder (FW 443 CB Type) equipped with a sausage filling funnel and cellulose casings (Viscofan, composed of 65% regenerated cellulose, 18% glycerine, 15% eau and 2% oil). After removing the casings, the sausages are cooked in a Miele steam oven at 121° C. for 15 min, hydrated for 48 h and grilled in a pan. The obtained sausages have an attractive texture and color.

TABLE 4

Nutritional analysis of the soy, pea, or wheat based meat analogues of the market and the one of the invention

| | Overall composition | Moisture g/100 g | Proteins g/100 g | Fibres g/100 g | Fat g/100 g | Salt g/100 g | Carbohydrates g/100 g | Sugars g/100 g | Gross Energy KJ/100 g |
|---|---|---|---|---|---|---|---|---|---|
| Ready-to-eat product of invention | P5 (analyzed) | 64.2 | 17.6 | 4.1 | 3.1 | 0.3 | 10.5 | 0.3 | 619.6 |
| | P5 (calculated) | 65.0 | 18.8 | 5.3 | 2.3 | 0.7 | 6.5 | 0.5 | 644.0 |
| | P4 (calculated) | 65.0 | 22.4 | 3.8 | 2.0 | 0.2 | 6.5 | 0.7 | 594.0 |
| Wheat protein based products | Seitanmedaillons | 55.5 | 31.4 | | 6.6 | 2.1 | 4.1 | 0.3 | 869.0 |
| | DAS Schnitzel | 51.6 | 25.1 | | 9.4 | 2.5 | 9.2 | 2.2 | 969.0 |
| | Frankenberger | 53.1 | 25.6 | | 12.0 | 1.4 | 6.2 | 1.7 | 981.0 |
| | Weenies | 49.0 | 30.6 | | 14.6 | 1.7 | 3.7 | 0.4 | 1123.0 |
| | Kebab gyros | 53.7 | 26.4 | | 12.4 | 2.5 | 3.5 | 1.5 | 993.0 |
| Soy or pea protein products | Beefy crumble | 63.6 | 23.6 | 1.8 | 9.1 | 1.2 | 1.8 | 1.8 | 837.4 |
| | Feisty crumble | 63.6 | 23.6 | 1.8 | 9.1 | 1.2 | 1.8 | 1.8 | 837.4 |
| | crumble grlled strips | 68.2 | 23.5 | 1.2 | 5.9 | 0.8 | 1.2 | 1.2 | 591.1 |
| | lightly seasoned strips | 65.9 | 23.5 | 2.4 | 3.5 | 0.8 | 4.7 | 0.0 | 591.1 |
| | Beast Burger | 59.3 | 20.4 | 3.5 | 14.2 | 0.8 | 2.7 | 0.0 | 963.3 |
| | Tofu Natur Bjorg | 70.6 | 16.9 | 1.5 | 9.9 | 0.0 | 0.4 | 0.7 | 684.0 |

Example 10

Vegan Meat Balls 740 g of product A5 from example 5 are mixed with 150 g cashew nuts, 100 g of water and 10 g of salt in a Stephan cutter (UM 12 V Type). The mixture is then formed through a Bomann meat grinder (FW 443 CB Type) and a very cohesive vegetable minced meat is obtained. The minced meat is formed by hand into "meat" balls The so formed meat balls are fried in oil at 150° C. for 15 min, hydrated thereafter in excess water and cooked in a pan. The obtained meat balls have an attractive taste, texture and appearance.

Example 11

Vegan Hamburgers 690 g of product A5 from example 5 are mixed with 300 g of carrots and 100 g of salt in a Stephan cutter (UM 12 V Type). The mixture is then formed into hamburgers using a Bomann meat grinder (FW 443 CB Type) and a hamburger shape. The so formed hamburgers are fried in oil at 150° C. for 15 min, hydrated thereafter in excess water and cooked in a pan. The obtained hamburgers have an attractive taste, texture and appearance. The carrot pieces can still be distinguished in the product and are very strongly embedded in the vegetable protein matrix.

The invention claimed is:

1. A method for obtaining an extended shelf-life proteinaceous meat analogue having a shelf life of at least 60 days, comprising the steps of:
    mixing, without adding water, at a temperature of less than 100° C. i) 30 to 90% (w/w) of powdered vegetable proteins including more than 50% (w/w) vital wheat gluten (VWG) and ii) 10 to 40% (w/w) of a non-aqueous plasticizer, thereby obtaining a dough,
    shaping said dough by at least cutting the dough into dough pieces and agglomerating said dough pieces with at least one inclusion that has a maximum linear dimension of at least 1 mm, thereby obtaining an agglomerate, and
    static heating said agglomerate between 120 and 160° C. under atmospheric pressure for 1 minute to 1 hour, thereby obtaining an extended shelf-life proteinaceous meat analogue having a shelf life of at least 60 days,
    wherein said powdered vegetable proteins have a water content of less than 15% (w/w),
    wherein said non-aqueous plasticizer has a water content of less than 20% (w/w), and wherein said non-aqueous plasticizer is selected from the group consisting of a polyhydroxy alcohol, a starch hydrolysate, a carboxylic acid, and a mixture thereof, and
    wherein said extended shelf-life proteinaceous meat analogue has a water content of less than 20% (w/w).

2. The method according to claim 1, wherein the mixing step comprises mixing:
    40 to 85% (w/w) of said powdered vegetable proteins,
    15 to 30% (w/w) of said non-aqueous plasticizer, and
    0 to 8% (w/w) of fibers.

3. The method according to claim 1, wherein the vegetable proteins are a mixture of vital wheat gluten and vegetable proteins from at least one origin selected from a group consisting of potato, lupine, soya, pea, chick pea plants, alfalfa, faba bean, lentil, bean, rapeseed, sunflower, and cereals.

4. The method according to claim 1, wherein the mixing step comprises mixing of 30 to 90% of VWG powder, 10 to 40% of the non-aqueous plasticizer, 0 to 40% of a vegetable protein other than VWG, and 0 to 8% of fibers.

5. The method according to claim 1, wherein the agglomeration is carried out by i) hydrating the dough pieces and/or said at least one inclusion and ii) mixing to obtain an agglomerate.

6. The method according to claim 1, wherein a food product, a food additive, and/or a processed food is added during the mixing step.

7. A method for obtaining a ready-to-eat proteinaceous meat analogue wherein said method comprises the steps of:
    obtaining an extended shelf-life proteinaceous meat analogue according to the method of claim 1,
    hydrating said extended shelf-life proteinaceous meat analogue, and
    obtaining a ready-to-eat proteinaceous meat analogue.

8. The method according to claim 1, wherein the mixing step further comprises mixing fibers with the vegetable proteins and the plasticizer.

9. The method according to claim 1, wherein said non-aqueous plasticizer is glycerol.

10. The method according to claim 1, wherein the method does not comprise adding a binder, wherein said binder is selected from the group consisting of eggs, xanthan, and starch.

11. The method according to claim 10, wherein the method does not comprise adding any binder.

12. The method according to claim 8, wherein the fibers are insoluble fibers.

13. The method according to claim 1, wherein said extended shelf-life proteinaceous meat analogue is vegan.

* * * * *